United States Patent
Park et al.

(10) Patent No.: US 9,531,528 B1
(45) Date of Patent: Dec. 27, 2016

(54) MULTI-CHIP TX BEAMFORMING FOR PER-PACKET SWITCHING WITHOUT LO PHASE ALIGNMENT CIRCUITRY

(71) Applicant: QUALCOMM Incorporated, San Diego, CA (US)

(72) Inventors: Hyunsik Park, San Jose, CA (US); Shahram Abdollahi-Alibeik, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/863,215

(22) Filed: Sep. 23, 2015

(51) Int. Cl.
*H04B 1/40* (2015.01)
*H04L 7/04* (2006.01)
*H04L 7/00* (2006.01)

(52) U.S. Cl.
CPC . *H04L 7/04* (2013.01); *H04B 1/40* (2013.01); *H04L 7/0087* (2013.01); *H04L 7/0091* (2013.01)

(58) Field of Classification Search
CPC ............ H04B 1/04; H04B 1/40; H04B 1/403; H04B 1/408; H04B 1/44; H04B 1/48; H04L 7/04; H04L 7/0091; H04L 7/0087
USPC ............ 455/75, 76, 78, 83, 84, 86, 118, 119
See application file for complete search history.

(56) References Cited

U.S. PATENT DOCUMENTS

| | | | |
|---|---|---|---|
| 2009/0262669 A1 | 10/2009 | Sanders | |
| 2014/0370882 A1* | 12/2014 | Liu | H04W 88/06 455/422.1 |
| 2015/0098541 A1 | 4/2015 | Ben-Bassat | |
| 2015/0162916 A1 | 6/2015 | Mo et al. | |
| 2015/0180415 A1 | 6/2015 | Fernandes | |

OTHER PUBLICATIONS

Rahn D.G., et al., "A Fully Integrated Multiband MIMO WLAN Transceiver RFIC," IEEE Journal of Solid-State Circuits, Aug. 2005, vol. 40 (8), pp. 1629-1641.

* cited by examiner

*Primary Examiner* — Nguyen Vo
(74) *Attorney, Agent, or Firm* — Paradice and Li LLP

(57) ABSTRACT

A wireless communications device that produces phase-synchronized local oscillator (LO) signals without dedicated LO phase alignment circuitry. The wireless communications device includes a first transceiver chain to receive a first timing signal and a second transceiver chain to receive the first timing signal and a second timing signal. The first transceiver chain includes a first frequency divider to convert the first timing signal to a first LO signal. The second transceiver chain includes a second frequency divider to convert the first timing signal to a second LO signal, a third frequency divider to convert the second timing signal to a third LO signal, and a multiplexer to select either the second LO signal or the third LO signal for transmitting wireless signals via the second transceiver chain based at least in part on an operating mode of the wireless communications device.

30 Claims, 8 Drawing Sheets

MULTI-CHIP TX BEAMFORMING FOR PER-PACKET SWITCHING WITHOUT LO PHASE ALIGNMENT CIRCUITRY

TECHNICAL FIELD

The example embodiments relate generally to transmit beamforming, and specifically to systems and methods for enabling transmit beamforming using multiple wireless radios without phase alignment circuitry.

BACKGROUND OF RELATED ART

Frequency synthesizers may generate high frequency local oscillator (LO) signals based on lower frequency reference signals. The LO signals generated by a frequency synthesizer may be used by a wireless radio of a communications device to transmit and/or receive data signals. For example, a transmit (TX) chain of the wireless radio may use the LO signals to up-convert a data signal from a baseband frequency to a carrier frequency, and a receive (RX) chain of the wireless radio may use the LO signals to down-convert a received data signal from the carrier frequency to the baseband frequency. The carrier frequency may be the frequency at which data signals are transmitted between communications devices, and the baseband frequency may be the frequency at which circuitry (e.g., a baseband processor) within the communications devices processes data signals. The baseband frequency is typically one or more orders of magnitude less than the carrier frequency, and the LO signals typically have a frequency similar to (or the same as) the carrier frequency.

When a frequency synthesizer is coupled to both the TX chain and the RX chain of a wireless radio, propagation of the LO signals from the frequency synthesizer to the TX chain and/or the RX chain may undesirably leak power into one or more circuits of the TX chain and/or the RX chain, which in turn may degrade performance of the wireless radio.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A wireless communications device that produces phase-synchronized local oscillator (LO) signals, without the use of phase adjustment circuitry, is disclosed herein. The wireless communications device includes a first transceiver chain to receive a first timing signal and a second transceiver chain to receive the first timing signal and a second timing signal. The first transceiver chain includes a first frequency divider to convert the first timing signal to a first LO signal by reducing a frequency of the first timing signal to a first carrier frequency. The second transceiver chain includes a second frequency divider to convert the first timing signal to a second LO signal by reducing the frequency of the first timing signal to the first carrier frequency, and a third frequency divider to convert the second timing signal to a third LO signal, concurrently while the first timing signal is converted to the second LO signal, by reducing the frequency of the second LO signal to a second carrier frequency. The second transceiver chain further includes a first set of signal selection circuitry to select one of the second or third LO signals to be used for transmitting or receiving wireless signals via the second transceiver based at least in part on an operating mode of the wireless communications device.

The first and second frequency dividers remain continuously active, independent of the operating mode of the wireless communications device, to maintain a constant phase relationship between the first LO signal and the second LO signal. This may enable the wireless communications device to perform beamforming operations much more quickly when switching between the second LO signal and the third LO signal (e.g., on a per-packet switching basis). For example, the first set of signal selection circuitry may select the second LO signal when the wireless communications device operates in an 80 MHz channel bandwidth mode (e.g., where the first and second transceivers operate on the same 80 MHz bandwidth), as defined by the IEEE 802.11 ac specification. On the other hand, the first set of signal selection circuitry may select the third LO signal when the wireless communications device operates in an 80+80 MHz channel bandwidth mode (e.g., where the first and second transceivers operate on different 80 MHz bandwidths), as defined by the IEEE 802.11 ac specification.

The wireless communications device may further include a third transceiver chain to receive a third timing signal and a fourth transceiver chain to receive the third timing signal and a fourth timing signal. The third transceiver chain includes a fourth frequency divider to convert the third timing signal to a fourth LO signal by reducing a frequency of the third timing signal to the first carrier frequency. The fourth transceiver chain includes a fifth frequency divider to convert the third timing signal to a fifth LO signal by reducing the frequency of the third timing signal to the first carrier frequency, and a sixth frequency divider to convert the fourth timing signal to a sixth LO signal, concurrently while the third timing signal is converted to the fifth LO signal, by reducing a frequency of the fourth timing signal to the second carrier frequency. The wireless communications device may also include a second set of signal selection circuitry to select one of the fifth or sixth LO signals to be used for transmitting or receiving wireless signals via the fourth transceiver chain based at least in part on the operating mode of the wireless communications device.

The first, second, fourth, and fifth frequency dividers may remain continuously active, independent of the operating mode of the wireless communications device, to maintain a constant phase relationship between the first, second, fourth, and fifth LO signals. Similarly, the third and sixth frequency dividers may remain continuously active, independent of the operating mode of the wireless communications device, to maintain a constant phase relationship between the third and sixth LO signals.

Additionally, the wireless communications device may include a first frequency synthesizer to generate the first timing signal and a second frequency synthesizer to generate the second timing signal. The first and second frequency synthesizers may be provided on a first chip. The wireless communications device may also include a third frequency synthesizer to generate the third timing signal and a fourth frequency synthesizer to generate the fourth timing signal. The third and fourth frequency synthesizers may be provided a second chip, separate from the first chip.

In example embodiments, the first frequency synthesizer maintains a constant phase relationship with the third frequency synthesizer, while the second frequency synthesizer maintains a constant phase relationship with the fourth frequency synthesizer. For example, each of the first, second, third, and fourth frequency synthesizers may be locked in phase to a common reference clock signal.

By continuously maintaining LO signals for multiple carrier frequency, the wireless communications device may quickly switch between different modes of communication and/or operation (e.g., 80 MHz channel bandwidth mode and 80+80 MHz channel bandwidth mode). Moreover, because the LO signals are continuously running, the phase relationships between the LO signals remain constant, and do not change even when switching between the different modes. This may enable the wireless communications device to perform beamforming operations near-instantly and/or on a per-packet switching basis, without the use of phase adjustment circuitry.

BRIEF DESCRIPTION OF THE DRAWINGS

The example embodiments are illustrated by way of example and are not intended to be limited by the figures of the accompanying drawings.

DETAILED DESCRIPTION

Figure 1:
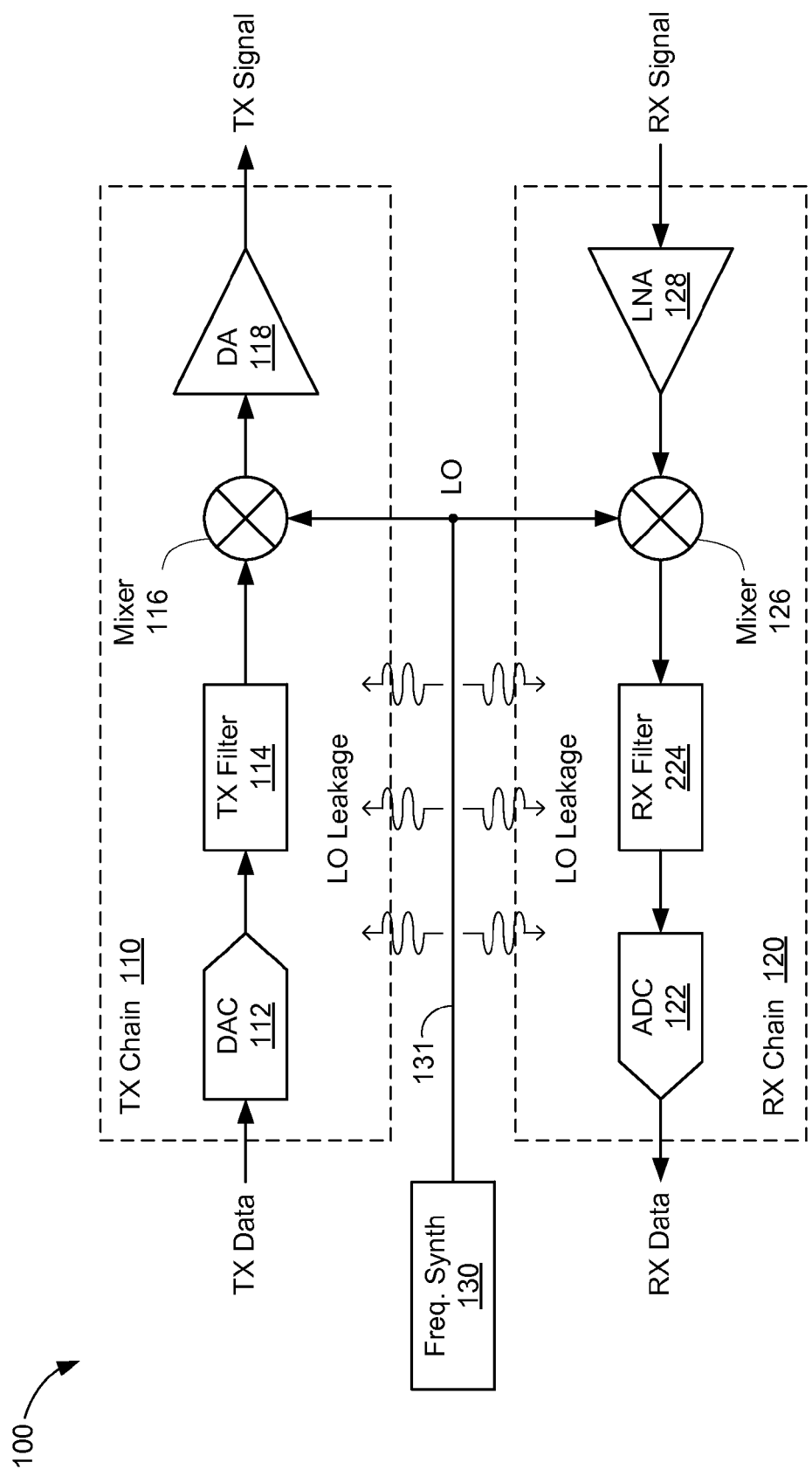
FIG. 1 shows a block diagram of an example wireless radio.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth), Hiper-LAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots.

In the following description, numerous specific details are set forth such as examples of specific components, circuits, and processes to provide a thorough understanding of the present disclosure. The term "coupled" as used herein means connected directly to or connected through one or more intervening components or circuits. The term "transmit beamforming" (or "TX beamforming") refers to a process by which a transmitting device (e.g., a "beamformer") shapes its outgoing data frames to be transmitted as a set of wireless signals focused in the direction of a receiving device (e.g., a "beamformee"). Accordingly, the set of focused wireless signals may be collectively referred to herein as a "beamformed signal."

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the example embodiments. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As mentioned above, when a frequency synthesizer is coupled to both the TX chain and the RX chain of a wireless radio, propagation of local oscillator (LO) signals from the frequency synthesizer to the TX chain and/or the RX chain may undesirably leak power into one or more circuits of the TX chain and/or the RX chain, which in turn may degrade performance of the wireless radio. For example, FIG. 1 shows a block diagram of an analog front-end (AFE) circuit 100. The wireless radio 100 includes a TX chain 110, an RX chain 120, and a frequency synthesizer 130. The TX chain 110 and RX chain 120 may be coupled to one or more antennas (not shown for simplicity) for transmitting and receiving signals, respectively, over a wireless medium. The frequency synthesizer 130 generates an LO signal at a selected carrier frequency.

The TX chain 110 includes a digital-to-analog converter (DAC) 112, a TX filter 114, a mixer 116, and a driver amplifier (DA) 118. The DAC 112 converts outgoing data (TX data) to an analog data signal, which is filtered via the TX filter 114. The analog data signal is then up-converted from the baseband frequency to the carrier frequency by the mixer 116, for example, by mixing the analog data signal with the LO signal. The up-converted data signal is amplified by the DA 118 and subsequently output as a wireless transmit (TX) signal.

The RX chain 120 includes an analog-to-digital converter (ADC) 122, an RX filter 124, a mixer 126, and a low-noise amplifier (LNA) 128. The LNA 128 receives and amplifies a received wireless (RX) signal. The mixer 126 down-converts the RX signal from the carrier frequency to the baseband frequency, for example, by mixing the RX signal with the LO signal. The down-converted data signal is filtered by the RX filter 124, and then converted to a digital bitstream of RX data by the ADC 122.

The presence of strong LO signals may lead to LO leakage in the TX chain 110 and/or in the RX chain 120. For example, LO signals propagating along a signal path 131 from the frequency synthesizer 130 to the mixers 116 and 126 may leak power to circuitry (e.g., mixer 116 and/or DA 118) within the TX chain 110 and/or to circuitry (e.g., mixer 126 and/or LNA 128) within the RX chain 120. Because the frequency of the LO signals is typically at or near the carrier frequency, LO leakage may adversely affect the transmission of the TX signals and/or the reception of the RX signals.

Figure 2:
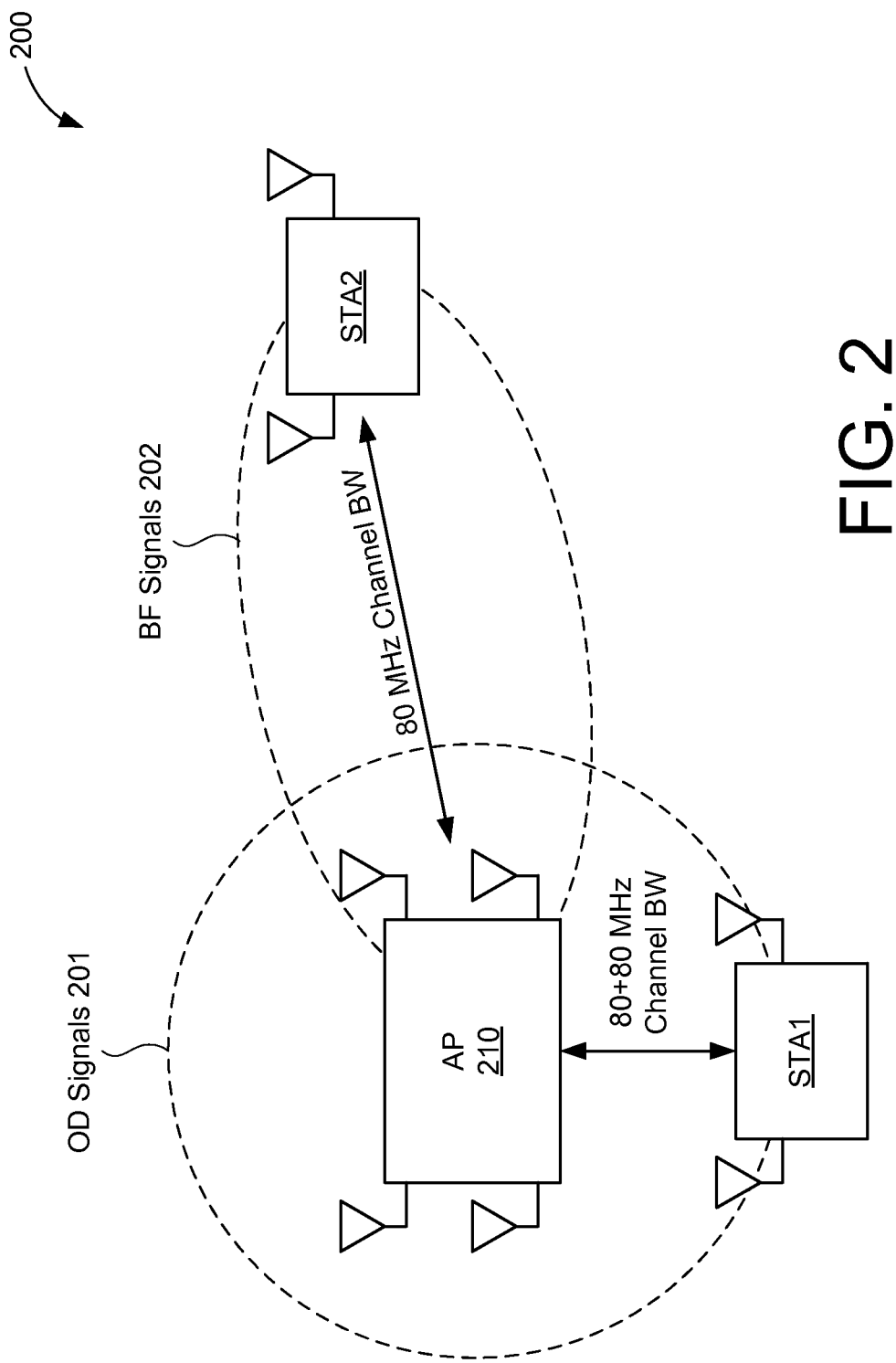
FIG. 2 shows a block diagram of a communications system within which the example embodiments may be implemented.

FIG. 2 shows a block diagram of a communications system 200 within which the example embodiments may be implemented. The communications system 200 is shown to include a wireless access point (AP) 210 and two wireless stations STA1 and STA2. The AP 210 and wireless stations STA1 and STA2 may operate according to the IEEE 802.11 family of standards (or according to other suitable wireless protocols).

The AP 210 may be any suitable device that allows one or more wireless devices to connect to a network (e.g., a local area network (LAN), wide area network (WAN), metropolitan area network (MAN), and/or the Internet) via the AP 210 using Wi-Fi, Bluetooth, or any other suitable wireless communication standards. The AP 210 may be assigned a unique media access control (MAC) address that is programmed therein by, for example, a device manufacturer. For some embodiments, the AP 210 may be any suitable wireless device (e.g., such as a wireless STA) acting as a software-enabled access point ("SoftAP"). For at least one embodiment, the AP 210 may include a plurality of transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 7.

Each of the stations STA1 and STA2 may be any suitable Wi-Fi enabled wireless device including, for example, a cell phone, personal digital assistant (PDA), tablet device, laptop computer, or the like. Each of the stations STA1 and STA2 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Each station STA1 and STA2 may also be assigned a unique MAC address. For at least some embodiments, the stations STA1 and STA2 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 7.

For the AP 210 and/or stations STA1 and STA2, the one or more transceivers may include Wi-Fi transceivers, Bluetooth transceivers, NFC transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers may be any technically feasible transceiver such as a ZigBee transceiver described by the ZigBee specification, a WiGig transceiver, and/or a HomePlug transceiver described in a specification from the HomePlug Alliance.

In example embodiments, the AP 210 and wireless stations STA1 and STA2 may operate in accordance with the IEEE 802.11ac specification. The IEEE 802.11ac specification introduces a number of additional features and enhancements to the IEEE 802.11 standards. For example, the IEEE 802.11ac specification defines a contiguous 80 MHz channel bandwidth and an optional "80+80" MHz channel bandwidth. A wireless device that supports the 80+80 MHz channel bandwidth may transmit and receive data over a first 80 MHz frequency band or channel (e.g., via a first transceiver chain) while concurrently transmitting and receiving data over a second 80 MHz frequency band or channel (e.g., via a second transceiver chain).

The IEEE 802.11ac specification also describes an explicit beamforming technique that may be used by a transmitting device to focus energy towards a single receiving device (or group of receiving devices). By focusing wireless signals in a particular direction (e.g., as opposed to radiating signals in all directions), the transmitting device may increase the range, signal-to-noise ratio (SNR), and/or throughput (e.g., data rate) of data communications with the receiving device. To be capable of beamforming, a transmitting device may need multiple antennas and multiple transceiver chains. When beamforming, multiple antennas of the transmitting device may transmit the same wireless signal with different phase offsets to "steer" the signal in particular direction. The phase-shifted signals may converge (e.g., to produce a "beamformed signal") along the path between the transmitting device and the receiving device.

In the example of FIG. 2, the AP 210 communicates with STA1 using the 80+80 MHz channel bandwidth. More specifically, when operating in a 80+80 MHz channel bandwidth mode (hereinafter referred to as the "80+80 Mode"), the AP 210 may transmit omnidirectional (OD) wireless signals 201 on a first 80 MHz channel (e.g., of the 5 GHz frequency band) and on a second 80 MHz channel, concurrently. The first and second 80 MHz channels may correspond to contiguous or non-contiguous 80 MHz channels. For example, the AP 210 may include multiple transceivers or transceiver chains (not shown in FIG. 2 for simplicity) that may operate on (e.g., communicate over) respective 80 MHz channels of the 5 GHz frequency band. Thus, while a first transceiver chain of the AP 210 transmits a first subset of the OD signals 201 to STA1 via the first 80 MHz channel, a second transceiver chain of the AP 210 may concurrently transmit a second subset of the OD signals 201 to STA1 via the second 80 MHz channel.

Furthermore, the AP 210 may communicate with STA2 using beamforming techniques. More specifically, when operating in a beamforming mode (hereinafter referred to as the "BF Mode"), the AP 210 may transmit beamformed (BF) wireless signals 202 to STA2 over an 80 MHz channel. For example, the AP 210 may determine a relative location of STA2, and thus the direction in which to direct the BF signals 202, using "sounding" techniques. Sounding is the process by which the AP 210 may acquire channel state information (CSI), for example, by transmitting training data and/or metadata to STA2 in the form of null data packets (NDPs). STA2 may calculate a feedback vector based at least in part on the corresponding training data, and may return the feedback vector to the AP 210 in the form of a compressed beamforming frame. The AP 210 may use the feedback vector to generate a steering matrix with which to pre-code data streams intended for STA2. More specifically, the AP 210 may use the steering matrix to produce (or "steer") the BF signals 202 in the direction of STA2.

To enable beamforming, the AP 210 may need to operate multiple transceiver chains on the same 80 MHz channel. For example, the local oscillator (LO) signals in each transceiver chain of the AP 210 may be tuned to the same frequency of oscillation. Moreover, the phases of the LO signals in each of the transceiver chains of the AP 210 should be aligned or at least known (e.g., so that an appropriate phase offset can be applied to an outgoing data signal) to generate a beamformed signal. However, the LO signals may become misaligned when one or more of the transceiver chains in the AP 210 changes carrier frequencies (e.g., when the AP 210 switches between the 80+80 Mode and the BF Mode and/or local frequency dividers are reset). Conventional phase alignment circuitry may be too slow (and thus inadequate) to detect and/or adjust the phases of the LO signals in high-speed switching applications (e.g., on a per-packet switching basis).

In example embodiments, each transceiver chain in the AP 210 may continuously generate and/or maintain an LO signal that is tuned to the carrier frequency used for beamforming. The continuously-running (or "persistent") LO signals may be in a constant state of phase synchronization with one another (e.g., to maintain a constant phase relationship and/or offset between the LO signals), thus enabling the AP 210 to instantly generate BF signals 202 when switching between the 80+80 Mode and the BF Mode (e.g., on a per-packet switching basis).

As described above with respect to FIG. 1, LO signals may leak power into the circuitry of the transceiver chains. Continuously maintaining multiple LO signals may create even more LO leakage in the transceiver chains. In example embodiments, the AP 210 may mitigate LO leakage by reducing the distance of travel of the persistent LO signals, which in turn may reduce the exposure of the transceiver circuitry to LO leakage.

Figure 3:
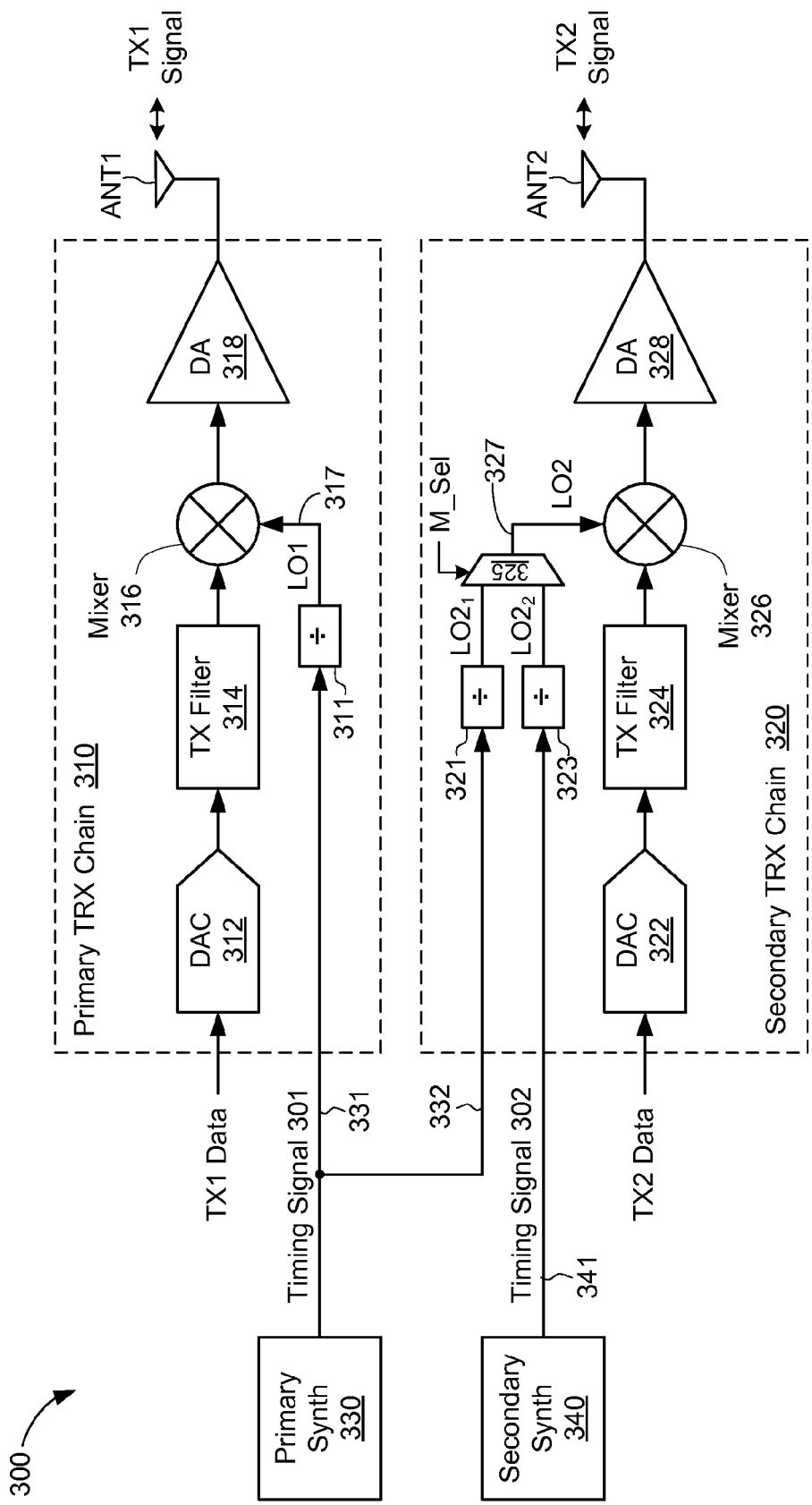
FIG. 3 shows a block diagram of a wireless radio, in accordance with example embodiments.

FIG. 3 shows a block diagram of a wireless radio 300, in accordance with example embodiments. The wireless radio 300 may be implemented within a wireless device (e.g., such as the AP 210 and/or stations STA1 and STA2 of FIG. 2) to transmit and receive data signals over a wireless medium. The wireless radio 300 includes a primary transceiver (TRX) chain 310, a secondary TRX chain 320, a primary frequency synthesizer 330, and a secondary frequency synthesizer 340. In example embodiments, the primary TRX chain 310 may operate on a first 80 MHz channel of the 5 GHz frequency band, and the secondary TRX chain 320 may be selectively configured to operate on the first 80 MHz channel or on a second 80 MHz channel of the 5 GHz frequency band (e.g., depending on an operating mode of the wireless radio 300).

The primary TRX chain 310 may include TX circuitry to transmit outgoing (TX) data signals via a first antenna ANT1, and may include RX circuitry to receive incoming (RX) data signals via the first antenna ANT1 or a separate antenna (not shown for simplicity). For simplicity, the RX circuitry of primary TRX chain 310 is not shown in FIG. 3. The TX circuitry of primary TRX chain 310 includes a digital-to-analog converter (DAC) 312, a transmit (TX) filter 314, a mixer 316, and a driver amplifier (DA) 318 coupled to the first antenna ANT1. The DAC 312 may convert a first stream of outgoing (TX1) data to an analog data signal, which is filtered by the TX filter 314. The filtered analog data signal is then up-converted to a first carrier frequency (e.g., corresponding to the first 80 MHz channel) by the mixer 316, for example, by mixing the analog data signal with a primary LO signal (LO1). The up-converted analog data signal is amplified by the DA 318 and subsequently transmitted via ANT1 as a first wireless data (TX1) signal.

The secondary TRX chain 320 may include TX circuitry to transmit TX data signal via a second antenna ANT2, and may include RX circuitry to receive RX data signals via the second antenna ANT2 or a separate antenna (not shown for simplicity). For simplicity, the RX circuitry of secondary TRX chain 320 is not shown in FIG. 3. The TX circuitry of secondary TRX chain 320 includes a DAC 322, a TX filter 324, a mixer 326, and a DA 328 coupled to the second antenna ANT2. The DAC 322 may convert a second stream of outgoing (TX2) data to an analog data signal, which is filtered by the TX filter 324. The filtered analog data signal is then up-converted to either the first carrier frequency or a second carrier frequency (e.g., corresponding to the second 80 MHz channel) by the mixer 326, for example, by mixing the analog data signal with a secondary LO signal (LO2). The up-converted analog data signal is amplified by the DA 328 and subsequently transmitted via ANT2 as a second wireless data (TX2) signal.

In example embodiments, the primary frequency synthesizer 330 generates a first timing signal 301 having a frequency of oscillation significantly greater than the first carrier frequency. For example, the frequency of the first timing signal 301 may be a multiple of (e.g., twice) the first carrier frequency. The secondary frequency synthesizer 340 generates a second timing signal 302 having a frequency of oscillation significantly greater than the second carrier frequency. For example, the frequency of the second timing signal 302 may be a multiple of (e.g., twice) the second carrier frequency. The first timing signal 301 is provided to the primary TRX chain 310 and to the secondary TRX chain 320, whereas the second timing signal 302 is provided to the secondary TRX chain 320 only.

A frequency divider 311 provided in the primary TRX chain 310 receives the first timing signal 301 and generates the primary LO signal (LO1) based on the first timing signal 301. For example, the frequency divider 311 may reduce the frequency of the first timing signal 301 to the first carrier frequency (e.g., using well-known frequency division techniques). The resulting frequency-reduced timing signal may be output by the frequency divider 311 as the primary LO signal LO1. Similarly, a first frequency divider 321 provided in the secondary TRX chain 320 receives the first timing signal 301 and generates a first LO signal $LO2_1$ (e.g., that may be selected as the secondary LO signal LO2), for example, by reducing the frequency of the first timing signal 301 to the first carrier frequency. A second frequency divider 323 provided in the second TRX chain 320 receives the second timing signal 302 and generates a second LO signal $LO2_2$ (e.g., that may be selected as the secondary LO signal LO2), for example, by reducing the frequency of the second timing signal 302 to the second carrier frequency.

The secondary TRX chain 320 may further include a multiplexer 325 that receives the first and second LO signals $LO2_1$ and $LO2_2$, respectively, and selectively outputs one of the LO signals $LO2_1$ or $LO2_2$ as the secondary LO signal LO2. For some embodiments, the multiplexer 325 may select one of the LO signals $LO2_1$ and $LO2_2$ based at least in part on an operating mode of the wireless radio 300. For example, the multiplexer 325 may select the second LO signal $LO2_2$ (e.g., to operate the secondary TRX chain 320 on the second 80 MHz channel) when the wireless radio 300 is to operate in the 80+80 Mode. On the other hand, the multiplexer 325 may select the first LO signal $LO2_1$ (e.g., to operate the secondary TRX chain 320 on the first 80 MHz channel) when the wireless radio 300 is to operate in the BF Mode and/or in a single 80 MHz channel bandwidth mode. For some embodiments, the multiplexer 325 may be responsive to a mode select (M_Sel) signal indicating the operating mode of the wireless radio 300.

When a frequency divider is turned on or activated (e.g., from a low-power and/or idle state), the frequency divider may introduce a random phase offset in the frequency-divided output signal (e.g., the LO signal). Thus, the phases of LO signals generated by multiple frequency dividers may differ from one another. To conserve power, frequency dividers are typically turned off or deactivated when not in use (e.g., when the LO signal generated by a particular frequency divider is not needed). However, the phase differences between the LO signals may vary each time one or more of the frequency dividers are deactivated and reactivated. This may make beamforming difficult, if not impossible, without proper phase detection and/or alignment circuitry. However, as described above, conventional phase alignment circuitry may be inadequate for detecting and/or adjusting the phases of the LO signals in high-speed switching applications (e.g., on a per-packet switching basis).

In example embodiments, the frequency dividers 311 and 321 may remain continuously active (e.g., to maintain the LO signals LO1 and $LO2_1$, respectively, in a constant or persistent state), regardless of the operating mode of the wireless radio 300. For example, frequency divider 321 may continue to generate the first LO signal $LO2_1$, based on the first timing signal 301, even when the wireless radio 300 operates in the 80+80 Mode (during which the secondary LO signal LO2 tracks the second LO signal $LO2_2$). Any phase offset or difference between the LO signals LO1 and $LO2_1$ is maintained for the duration that the frequency dividers 311 and 321 remain active. Thus, by maintaining the frequency dividers 311 and 321 in a continuously active state, the example embodiments may ensure that the first LO signal $LO2_1$ maintains a constant and continuous phase relationship with the primary LO signal LO1. Thus, when the wireless radio 300 switches to the BF Mode, the secondary LO signal LO2 may already be phase-synchronized with the primary LO signal LO1, and the wireless radio 300 may immediately begin generating beamformed signals using the TRX chains 310 and 320.

As described above, the first and second timing signals 301 and 302 may be converted into LO signals (e.g., LO1 and LO2). However, because the frequencies of the timing signals 301 and 302 are significantly higher than the first and second carrier frequencies, respectively, the timing signals 301 and 302 may not leak power into the TRX chains 310 and/or 320. More specifically, the signal path 317 between frequency divider 311 and mixer 316 may be significantly shorter than the signal path 331 between the primary frequency synthesizer 330 and the frequency divider 311 to reduce and/or minimize LO leakage into primary TRX chain 310 attributable to the primary LO signal LO1. Further, the signal path 327 between frequency divider 321 and mixer 326 may be significantly shorter than the signal path 332 between the primary frequency synthesizer 330 and the frequency divider 321 to reduce and/or minimize LO leakage into secondary TRX chain 320 attributable to the first LO signal $LO2_1$ and/or secondary LO signal LO2. Still further, the signal path 327 between frequency divider 323 and mixer 326 may be significantly shorter than the signal path 341 between the secondary frequency synthesizer 340 and the frequency divider 323 to reduce and/or minimize LO leakage into secondary TRX chain 320 attributable to the second LO signal $LO2_2$ and/or secondary LO signal LO2.

The example embodiments may therefore provide persistent LO signals (e.g., LO1 and $LO2_1$) that enable the wireless radio 300 to perform TX beamforming on a per-packet switching basis while reducing or otherwise mitigating the effects of LO leakage that may be attributed to the LO signals. Although only two transceiver chains are shown (for simplicity) in the example of FIG. 3, the embodiments described herein may be readily applied to wireless radio having any number of transceiver chains. For some embodiments, the systems and methods described herein may allow beamforming to be performed across multiple wireless radios and/or chips.

Figure 4:
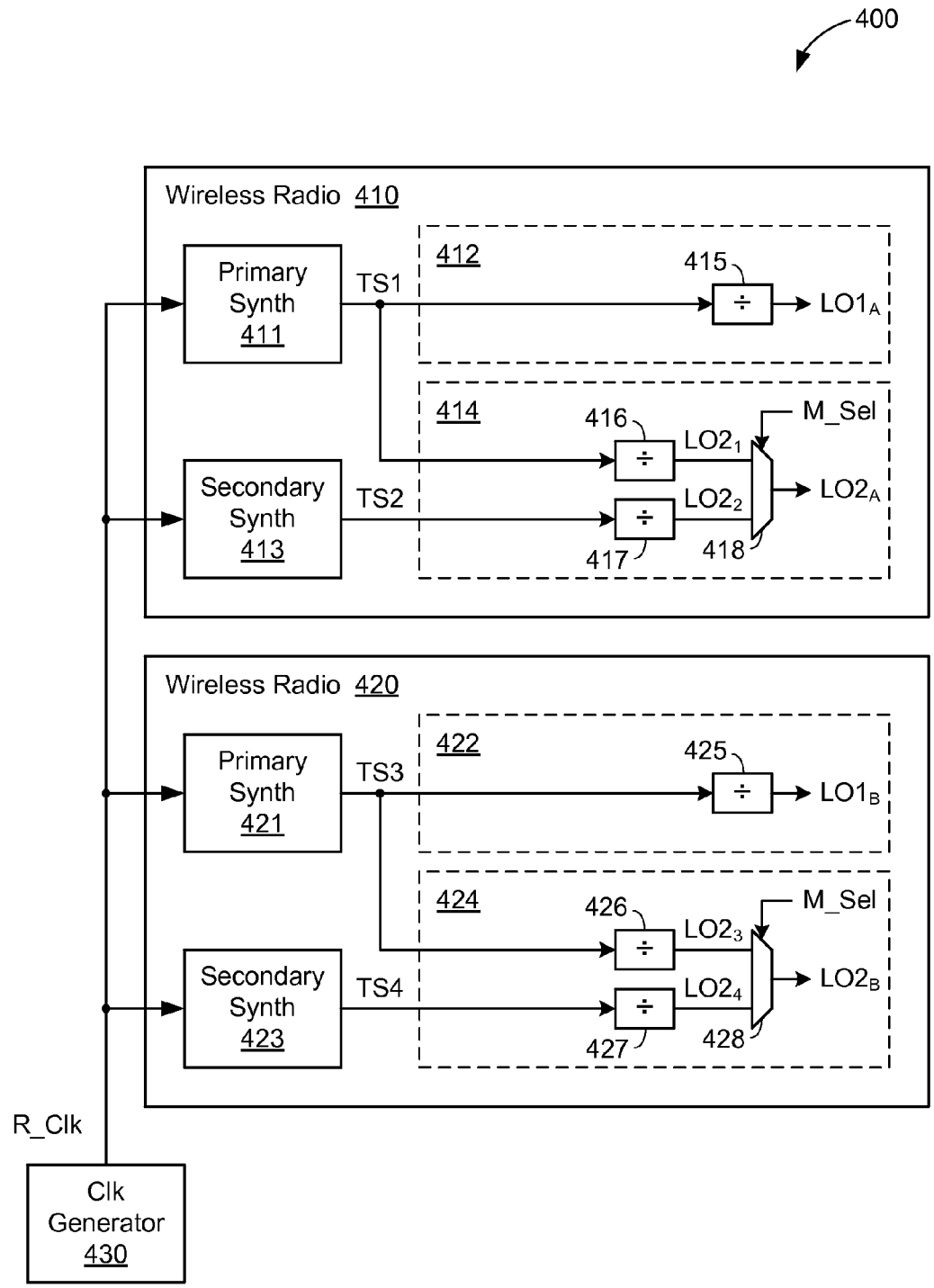
FIG. 4 shows a block diagram of a wireless communications device with multiple wireless radios, in accordance with example embodiments.

FIG. 4 shows a block diagram of a wireless communications device 400 with multiple wireless radios, in accordance with example embodiments. The wireless communications device 400 may be implemented within a wireless device (e.g., such as the AP 210 and/or stations STA1 and STA2 of FIG. 2) to transmit and receive data signals over a wireless medium. The wireless communications device 400 includes a first wireless radio 410, a second wireless radio 420, and a clock signal generator 430. In example embodiments, the first wireless radio 410 may be packaged or provided on a first chip, and the second wireless radio 420 may be packaged or provided on a second chip that is separate and distinct (e.g., physically separated) from the first chip. Further, each of the wireless radios 410 and 420 may be an embodiment of the wireless radio 300 of FIG. 3.

The first wireless radio 410 includes a primary frequency synthesizer 411, a primary TRX chain 412, a secondary frequency synthesizer 413, and a secondary TRX chain 414. In example embodiments, the primary TRX chain 412 may operate on a first 80 MHz channel of the 5 GHz frequency band, and the secondary TRX chain 414 may operate on the first 80 MHz channel or on a second 80 MHz channel of the 5 GHz frequency band (e.g., depending on the operating mode of the wireless radio 410 and/or the wireless communications device 400). For some embodiments, the first wireless radio 410 may include additional transceiver chains (not shown for simplicity).

The primary frequency synthesizer 411 generates a first timing signal TS1 having a frequency of oscillation significantly greater than a first carrier frequency (e.g., corresponding to the first 80 MHz channel). For example, the frequency of the first timing signal TS1 may be a multiple of (e.g., twice) the first carrier frequency. The secondary frequency synthesizer 413 generates a second timing signal TS2 having a frequency of oscillation significantly greater than a second carrier frequency (e.g., corresponding to the second 80 MHz channel). For example, the frequency of the second timing signal TS2 may be a multiple of (e.g., twice) the second carrier frequency. The first timing signal TS1 is provided to the primary TRX chain 412 and the secondary TRX chain 414, whereas the second timing signal TS2 is provided to the secondary TRX chain 414 only.

The primary TRX chain 412 includes a frequency divider 415 to generate a primary LO signal $LO1_A$ for the first wireless radio 410 based on the first timing signal TS1. For example, the frequency divider 415 may reduce the frequency of the first timing signal TS1 to the first carrier frequency. The resulting frequency-reduced timing signal may be output by the frequency divider 415 as the primary LO signal $LO1_A$. More specifically, the primary LO signal $LO1_A$ may be provided to TX and/or RX circuitry (not shown for simplicity) in the primary TRX chain 412 for transmitting and/or receiving wireless signals, respectively, on the first 80 MHz channel. For some embodiments, the signal path between frequency divider 415 and the TX/RX circuitry may be significantly shorter than the signal path between the primary frequency synthesizer 411 and the frequency divider 415, for example, to reduce and/or minimize LO leakage attributable to the primary LO signal $LO1_A$.

The secondary TRX chain 414 includes frequency dividers 416 and 417 to generate respective LO signals $LO2_1$ and $LO2_2$, and includes a multiplexer 418 to selectively output one of the LO signals $LO2_1$ or $LO2_2$ as the secondary LO signal $LO2_A$ for the first wireless radio 410. Frequency divider 416 may generate LO signal $LO2_1$ based on the first timing signal TS1, for example, by reducing the frequency of the first timing signal TS1 to the first carrier frequency. Frequency divider 417 may generate LO signal $LO2_2$ based on the second timing signal TS2, for example, by reducing the frequency of the second timing signal TS2 to the second carrier frequency.

The multiplexer 418 may select one of the LO signals $LO2_1$ or $LO2_2$ for output as the secondary LO signal $LO2_A$ based at least in part on an operating mode of the wireless communications device 400 and/or wireless radio 410. For example, the multiplexer 418 may select $LO2_1$ as the secondary LO signal $LO2_A$ (e.g., to operate the secondary TRX chain 414 on the first 80 MHz channel) when the wireless communications device 400 is to operate in a single 80 MHz channel bandwidth mode. On the other hand, the multiplexer 418 may select $LO2_2$ as the secondary LO signal $LO2_A$ (e.g., to operate the secondary TRX chain 414 on the second 80 MHz channel) when the wireless communications device 400 is to operate in the 80+80 Mode. For some embodiments, the multiplexer 418 may be responsive to a mode select (M_Sel) signal indicating the operating mode of the wireless communications device 400.

The secondary LO signal $LO2_A$ may be provided to TX and/or RX circuitry (not shown for simplicity) in the secondary TRX chain 414 for transmitting and/or receiving wireless signals, respectively, on the selected channel. For some embodiments, the signal path between frequency divider 416 and the TX/RX circuitry may be significantly shorter than the signal path between the primary frequency synthesizer 411 and the frequency divider 416, and the signal path between frequency divider 417 and the TX/RX circuitry may be significantly shorter than the signal path between the secondary frequency synthesizer 413 and the frequency divider 417. This may reduce and/or minimize LO leakage attributable to the secondary LO signal $LO2_A$ and/or LO signals $LO2_1$ and $LO2_2$.

The second wireless radio 420 includes a primary frequency synthesizer 421, a primary TRX chain 422, a secondary frequency synthesizer 423, and a secondary TRX chain 424. In example embodiments, the primary TRX chain 422 may operate on the same channel as the primary TRX chain 412 (e.g., the first 80 MHz channel) of the first wireless radio 410, and the secondary TRX chain 424 may operate on the same channel as either the primary TRX chain 412 (e.g., the first 80 MHz channel) or the secondary TRX chain 414 (e.g., the second 80 MHz channel) of the first wireless radio 410. For some embodiments, the second wireless radio 420 may include additional transceiver chains (not shown for simplicity).

The primary frequency synthesizer 421 generates a third timing signal TS3 having a frequency of oscillation significantly greater than (e.g., a multiple of) the first carrier frequency. The secondary frequency synthesizer 423 generates a fourth timing signal TS4 having a frequency of oscillation significantly greater than (e.g., a multiple of) the second carrier frequency. Accordingly, the third and fourth timing signals TS3 and TS4 may have the same frequencies as the first and second timing signals TS1 and TS2, respectively. The third timing signal TS3 is provided to the primary TRX chain 422 and the secondary TRX chain 424, whereas the fourth timing signal TS4 is provided to the secondary TRX chain 424 only.

The primary TRX chain 422 includes a frequency divider 425 to generate a primary LO signal $LO1_B$ for the second wireless radio 420 based on the third timing signal TS3. For example, the frequency divider 425 may reduce the frequency of the third timing signal TS3 to the first carrier frequency. The resulting frequency-reduced timing signal may be output by the frequency divider 425 as the primary LO signal $LO1_B$. More specifically, the primary LO signal $LO1_B$ of the second wireless radio 420 may have the same frequency as the primary LO signal $LO1_A$ of the first wireless radio 410. Thus, the primary LO signal $LO1_B$ may be provided to TX and/or RX circuitry (not shown for simplicity) in the primary TRX chain 422 for transmitting and/or receiving wireless signals, respectively, on the first 80 MHz channel. For some embodiments, the signal path between frequency divider 425 and the TX/RX circuitry may be significantly shorter than the signal path between the primary frequency synthesizer 421 and the frequency divider 425. This may reduce and/or minimize LO leakage attributable to the primary LO signal $LO1_B$.

The secondary TRX chain 424 includes frequency dividers 426 and 427 to generate respective LO signals $LO2_3$ and $LO2_4$, and includes a multiplexer 428 to selectively output one of the LO signals $LO2_3$ or $LO2_4$ as the secondary LO signal $LO2_B$ for the second wireless radio 420. Frequency divider 426 may generate LO signal $LO2_3$ based on the third timing signal TS3, for example, by reducing the frequency of the third timing signal TS3 to the first carrier frequency. Frequency divider 427 may generate LO signal $LO2_4$ based on the fourth timing signal TS4, for example, by reducing the frequency of the fourth timing signal TS4 to the second carrier frequency. Thus, LO signal $LO2_4$ of the second wireless radio 420 may have the same frequency as LO signal $LO2_2$ of the first wireless radio 410.

The multiplexer 428 may select one of the LO signals $LO2_3$ or $LO2_4$ for output as the secondary LO signal $LO2_B$ based at least in part on the operating mode of the wireless communications device 400 and/or wireless radio 420. For example, the multiplexer 428 may select $LO2_3$ as the secondary LO signal $LO2_B$ (e.g., to operate the secondary TRX chain 424 on the first 80 MHz channel) when the wireless communications device 400 is to operate in a single 80 MHz channel bandwidth mode. On the other hand, the multiplexer 428 may select $LO2_4$ as the secondary LO signal $LO2_B$ (e.g., to operate the secondary TRX chain 424 on the second 80 MHz channel) when the wireless communications device 400 is to operate in the 80+80 Mode. For some embodiments, the multiplexer 428 may also be responsive to the M_Sel signal.

The secondary LO signal $LO2_B$ may be provided to TX and/or RX circuitry (not shown for simplicity) in the secondary TRX chain 424 for transmitting and/or receiving wireless signals, respectively, on the selected channel. For some embodiments, the signal path between frequency divider 426 and the TX/RX circuitry may be significantly shorter than the signal path between the primary frequency synthesizer 421 and the frequency divider 426, and the signal path between frequency divider 427 and the TX/RX circuitry may be significantly shorter than the signal path between the secondary frequency synthesizer 423 and the frequency divider 427. This may reduce and/or minimize LO leakage attributable to the secondary LO signal $LO2_B$ and/or LO signals $LO2_3$ and $LO2_4$.

In example embodiments, the wireless communications device 400 may utilize transceiver chains from multiple wireless radios 410 and 420 to generate beamformed signals. For example, in some embodiments, the primary TRX chain 412 of the first wireless radio 410 and the primary TRX chain 422 of the second wireless radio 420 may concurrently generate a beamformed signal on the first 80 MHz channel. In other embodiments, the secondary TRX chain 414 of the first wireless radio 410 and the secondary TRX chain 424 of the second wireless radio 420 may concurrently generate a beamformed signal on the second 80 MHz channel. Still further, for some embodiments, the TRX chains 412, 414, 422, and 424 of the wireless communications device 400 may be used, concurrently, to generate a (more focused) beamformed signal on the first 80 MHz channel.

Thus, in the example embodiments, the frequency dividers 415-417 and 425-427 may remain continuously active to maintain the LO signals $LO1_A$, $LO1_B$, and $LO2_1$-$LO2_4$ in a constant or persistent state, regardless of the operating mode of the wireless communications device 400. As a result, LO signals $LO1_A$, $LO2_1$, $LO1_B$, and $LO2_3$ maintain phase synchronization for the duration that the frequency dividers 415, 416, 425 and 426 remain active. Similarly, LO signals $LO2_2$ and $LO2_4$ maintain phase synchronization for the duration that the frequency dividers 417 and 427 remain active. Accordingly, the wireless communications device 400 may perform transmit beamforming, on a per-packet switching basis, across any number of transceiver chains and/or across multiple wireless radios and/or chips.

Further, for some embodiments, the frequency synthesizers 411, 413, 421, and 423 may be locked in phase to the same reference clock (R_Clk) signal, generated by a shared clock signal generator 430. For example, the frequency synthesizers 411, 413, 421, and 423 may generate high frequency timing signals (e.g., TS1-TS4) based on a lower frequency reference signal (e.g., R_Clk). The clock signal generator 430 may comprise a crystal oscillator that generates a very accurate and reliable R_Clk signal at a low frequency of oscillation. In example embodiments, the frequency of the R_Clk signal may be substantially lower than (e.g., at least one-half of) the first and second carrier frequencies, thus reducing and/or minimizing LO leakage across the wireless radios 410 and 420.

In the example of FIG. 4, the LO signals $LO1_A$, $LO2_A$, $LO1_B$, and $LO2_B$ may be provided to both TX and RX circuitry in their respective transceiver chains 412, 414, 422, and 424. However, distributing the same LO signal to both TX and RX circuitry (e.g., as opposed to just the TX circuitry) may require longer signal paths for each of the LO signals, which may result in greater LO leakage. For some embodiments, LO leakage may be further reduced by providing separate frequency dividers, in each of the transceiver chains 412, 414, 422, and 424, to generate dedicated (e.g., separate) LO signals for the TX and RX circuitry of the wireless communications device 400.

Figure 5:
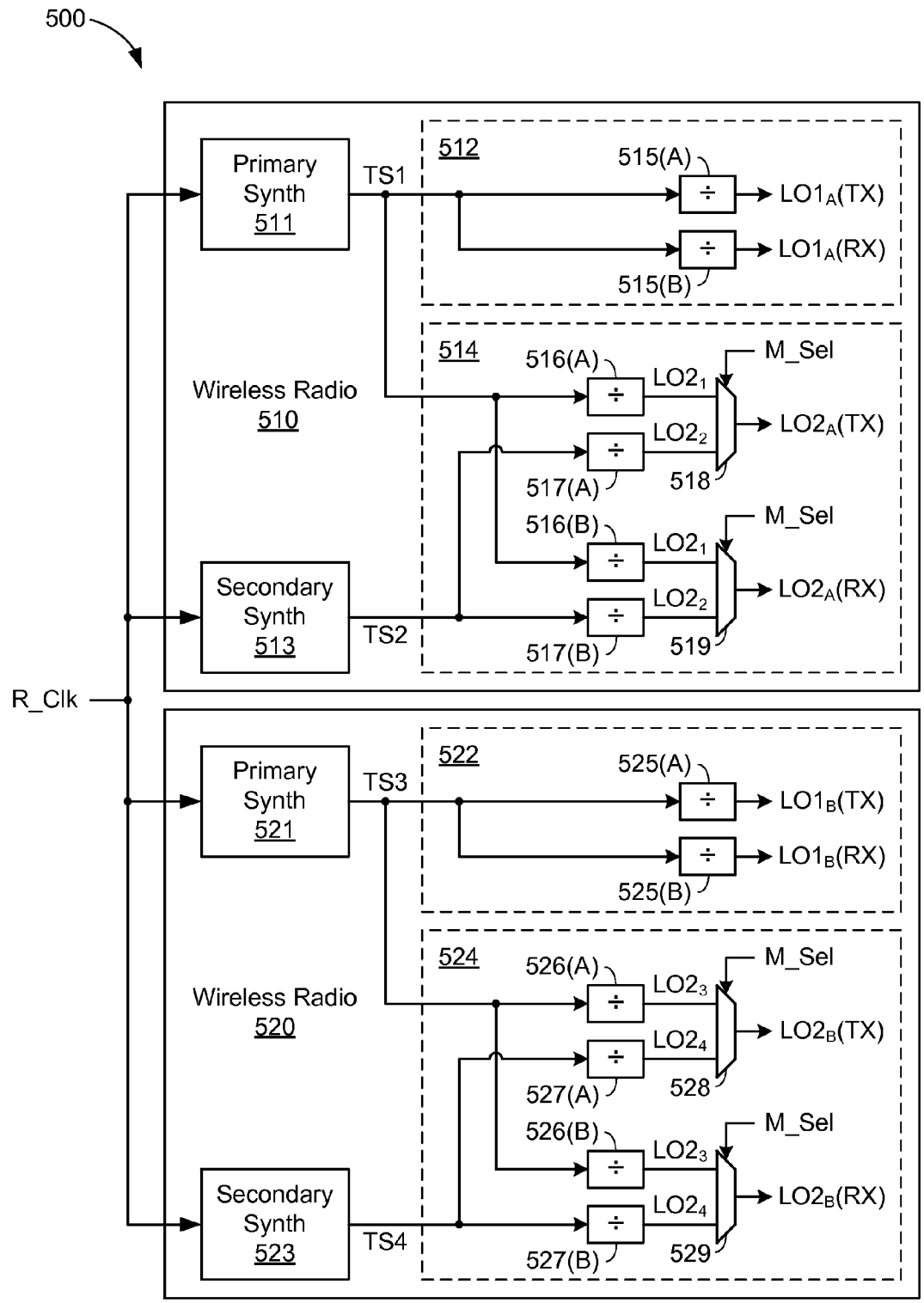
FIG. 5 shows a block diagram of a wireless communications device with multiple wireless radios, in accordance with other embodiments.

FIG. 5 shows a block diagram of a wireless communications device 500 with multiple wireless radios, in accordance with other embodiments. The wireless communications device 500 may be implemented within a wireless device (e.g., such as the AP 210 and/or stations STA1 and STA2 of FIG. 2) to transmit and receive data signals over a wireless medium. The wireless communications device 500 may be a more detailed or alternative embodiment of the wireless communications device 400 described above with respect to FIG. 4. Specifically, the wireless communications device 500 includes a first wireless radio 510 and a second wireless radio 520. In example embodiments, the first wireless radio 510 may be packaged or provided on a first chip, and the second wireless radio 520 may be packaged or provided on a second chip that is separate and distinct (e.g., physically separated) from the first chip.

The first wireless radio 510 includes a primary frequency synthesizer 511, a primary TRX chain 512, a secondary frequency synthesizer 513, and a secondary TRX chain 514. The frequency synthesizers 511 and 513 may operate in substantially the same manner as frequency synthesizers 411 and 413, respectively, of the wireless communications device 400 (e.g., described above with respect to FIG. 4). For example, the primary frequency synthesizer 511 may generate a first timing signal TS1 having a frequency of oscillation significantly greater than a first carrier frequency, and the secondary frequency synthesizer 513 may generate a second timing signal TS2 having a frequency of oscillation significantly greater than a second carrier frequency. In example embodiments, the primary TRX chain 512 may operate on a first 80 MHz channel of the 5 GHz frequency band, and the secondary TRX chain 514 may operate on the first 80 MHz channel or on a second 80 MHz channel of the 5 GHz frequency band (e.g., depending on the operating mode of the wireless radio 510 and/or the wireless communications device 500). For some embodiments, the first wireless radio 510 may include additional transceiver chains (not shown for simplicity).

The primary TRX chain 512 includes frequency dividers 515(A) and 515(B) to generate respective primary LO signals $LO1_A(TX)$ and $LO1_A(RX)$ that may be used by respective TX and RX circuitry (not shown for simplicity) in the primary TRX chain 512. Each of the frequency dividers 515(A) and 515(B) may be an embodiment of the frequency divider 415 of wireless communications device 400. Thus, the frequency dividers 515(A) and 515(B) may generate substantially similar (if not identical) LO signals $LO1_A(TX)$ and $LO1_A(RX)$, respectively, based on the first timing signal TS1. For some embodiments, the upper LO signal $LO1_A$(TX) may be used for transmitting wireless signals on the first 80 MHz channel, and the lower LO signal $LO1_A(RX)$ may be used for receiving wireless signals via the first 80 MHz channel.

By providing dedicated LO signals $LO1_A(TX)$ and $LO1_A(RX)$ for each of the TX and RX paths, respectively, of the primary TRX chain 512, the frequency dividers 515(A) and 515(B) may be placed closer to the TX and RX circuitry that receives the primary LO signals $LO1_A$ (e.g., compared to frequency divider 415). As described above, shortening the signals paths for the primary LO signals $LO1_A(TX)$ and $LO1_A(RX)$ may further reduce LO leakage in the primary TRX chain 512.

The secondary TRX chain 514 includes a first pair of frequency dividers 516(A) and 517(A) to generate respective LO signals $LO2_1$ and $LO2_2$ (e.g., based on timing signals TS1 and TS2, respectively), and includes a multiplexer 518 to selectively output one of the LO signals $LO2_1$ or $LO2_2$ (e.g., in response to an M_Sel signal) as the secondary LO signal $LO2_A(TX)$. The secondary TRX chain 514 further includes a second pair of frequency dividers 516(B) and 517(B) to generate respective LO signals $LO2_1$ and $LO2_2$ (e.g., based on timing signals TS1 and TS2, respectively), and includes a multiplexer 519 to selectively output one of the LO signals $LO2_1$ or $LO2_2$ (e.g., in response to the M_Sel signal) as the secondary LO signal $LO2_A(RX)$. The upper LO signal $LO2_A(TX)$ may be provided to TX circuitry (not shown for simplicity) of the secondary TRX chain 514, and the lower LO signal $LO2_A(RX)$ may be provided to RX circuitry (not shown for simplicity) of the secondary TRX chain 514.

Each pair of frequency dividers 516(A)/517(A) and 516(B)/517(B) may be an embodiment of the frequency-divider pair 416/417 of wireless communications device 400. Furthermore, each of the multiplexers 518 and 519 may be an embodiment of the multiplexer 418 of wireless communications device 400. Thus, the secondary LO signals $LO2_A(TX)$ and $LO2_A(RX)$ may substantially similar (if not identical) to one another. Moreover, by providing dedicated LO signals $LO2_A(TX)$ and $LO2_A(RX)$ for each of the TX and RX paths, respectively, of the secondary TRX chain 514, the frequency dividers 516(A) and 517(A) may be placed closer to the TX circuitry that receives the secondary LO signal $LO2_A(TX)$, and the frequency dividers 516(B) and 517(B) may be placed closer to the RX circuitry that receives the secondary LO signal $LO2_A(RX)$ (e.g., in comparison to the frequency dividers 416 and 417). As described above, shortening the signal paths for the secondary LO signals $LO2_A(TX)$ and $LO2_A(RX)$ may further reduce LO leakage in the secondary TRX chain 514.

The second wireless radio 520 includes a primary frequency synthesizer 521, a primary TRX chain 522, a secondary frequency synthesizer 523, and a secondary TRX chain 524. The frequency synthesizers 521 and 523 may operate in substantially the same manner as frequency synthesizers 421 and 423 of the wireless communications device 400 (e.g., described above with respect to FIG. 4). For example, the primary frequency synthesizer 521 may generate a third timing signal TS3 having a frequency of oscillation significantly greater than the first carrier frequency, and the secondary frequency synthesizer 523 may generate a fourth timing signal TS4 having a frequency of oscillation significantly greater than the second carrier frequency. Thus, the primary TRX chain 522 may operate on the first 80 MHz channel of the 5 GHz frequency band, and the secondary TRX chain 524 may operate on the first or on the second 80 MHz channel (e.g., depending on the operating mode of the wireless radio 520 and/or the wireless communications device 500). For some embodiments, the second wireless radio 520 may include additional transceiver chains (not shown for simplicity).

The primary TRX chain 522 includes frequency dividers 525(A) and 525(B) to generate respective primary LO signals $LO1_B(TX)$ and $LO1_B(RX)$ that may be used by TX and RX circuitry (not shown for simplicity), respectively, in the primary TRX chain 522. Each of the frequency dividers 525(A) and 525(B) may be an embodiment of the frequency divider 425 of wireless communications device 400. Thus, the frequency dividers 525(A) and 525(B) may generate substantially similar (if not identical) LO signals $LO1_B(TX)$ and $LO1_B(RX)$, respectively, based on the third timing signal TS3. As described above, the frequency dividers 525(A) and 525(B) may be placed closer to the TX and RX circuitry that receives the primary LO signals $LO1_B$ (e.g., compared to frequency divider 425), thus reducing LO leakage in the primary TRX chain 522. For some embodiments, the upper LO signal $LO1_B(TX)$ may be used for transmitting wireless signals on the first 80 MHz channel, and the lower LO signal $LO1_B(RX)$ may be used for receiving wireless signals via the first 80 MHz channel.

The secondary TRX chain 524 includes a first pair of frequency dividers 526(A) and 527(A) to generate respective LO signals $LO2_3$ and $LO2_4$ (e.g., based on timing signals TS3 and TS4, respectively), and includes a multiplexer 528 to selectively output one of the LO signals $LO2_3$ or $LO2_4$ (e.g., in response to the M_Sel signal) as the secondary LO signal $LO2_B(TX)$. The secondary TRX chain 524 further includes a second pair of frequency dividers 526(B) and 527(B) to generate respective LO signals $LO2_3$ and $LO2_4$ (e.g., based on timing signals TS3 and TS4, respectively), and includes a multiplexer 529 to selectively output one of the LO signals $LO2_3$ or $LO2_4$ (e.g., in response to the M_Sel signal) as the secondary LO signals $LO2_B(RX)$. The upper LO signal $LO2_B(TX)$ may be provided to TX circuitry (not shown for simplicity) of the secondary TRX chain 524, and the lower LO signal $LO2_B(RX)$ may be provided to RX circuitry (not shown for simplicity) of the secondary TRX chain 524.

Each pair of frequency dividers 526(A)/527(A) and 526(B)/527(B) may be an embodiment of the frequency-divider pair 426/427 of wireless communications device 400. Furthermore, each of the multiplexers 528 and 529 may be an embodiment of the multiplexer 428 of wireless communications device 400. Thus, the secondary LO signals $LO2_B(TX)$ and $LO2_B(RX)$ may substantially similar (if not identical) to one another. Moreover, by providing dedicated LO signals $LO2_B(TX)$ and $LO2_B(RX)$ for each of the TX and RX paths, respectively, of the secondary TRX chain 524, the frequency dividers 526(A) and 527(A) may be placed closer to the TX circuitry that receives the secondary LO signal $LO2_B(TX)$, and the frequency dividers 526(B) and 527(B) may be placed closer to the RX circuitry that receives the secondary LO signal $LO2_B(RX)$ (e.g., compared to frequency dividers 426 and 427). As described above, shortening the signal paths for the secondary LO signals $LO2_B(TX)$ and $LO2_B(RX)$ may further reduce LO leakage in the secondary TRX chain 524.

In example embodiments, the wireless communications device 500 may utilize transceiver chains from multiple wireless radios 510 and 520 to generate beamformed signals. For example, in some embodiments, the primary TRX chain 512 of the first wireless radio 510 and the primary TRX chain 522 of the second wireless radio 520 may concurrently generate a beamformed signal on the first 80 MHz channel. In other embodiments, the secondary TRX chain 514 of the first wireless radio 510 and the secondary TRX chain 524 of the second wireless radio 520 may concurrently generate a beamformed signal on the second 80 MHz channel. Still further, for some embodiments, the TRX chains 512, 514, 522, and 524 of the wireless communications device 500 may be used, concurrently, to generate a (more focused) beamformed signal on the first 80 MHz channel.

Thus, in the example embodiments, the frequency dividers 515-517 and 525-527 may remain continuously active to maintain constant phase synchronization between the LO signals, regardless of the operating mode of the wireless communications device 500. Moreover, the frequency synthesizers 511, 513, 521, and 523 may be locked in phase to the same reference clock (R_Clk) signal, generated by a shared clock signal generator (e.g., clock generator 430 of FIG. 4). Accordingly, the wireless communications device 500 may perform transmit beamforming, on a per-packet switching basis, across any number of transceiver chains and/or across multiple wireless radios and/or chips.

Figure 6:
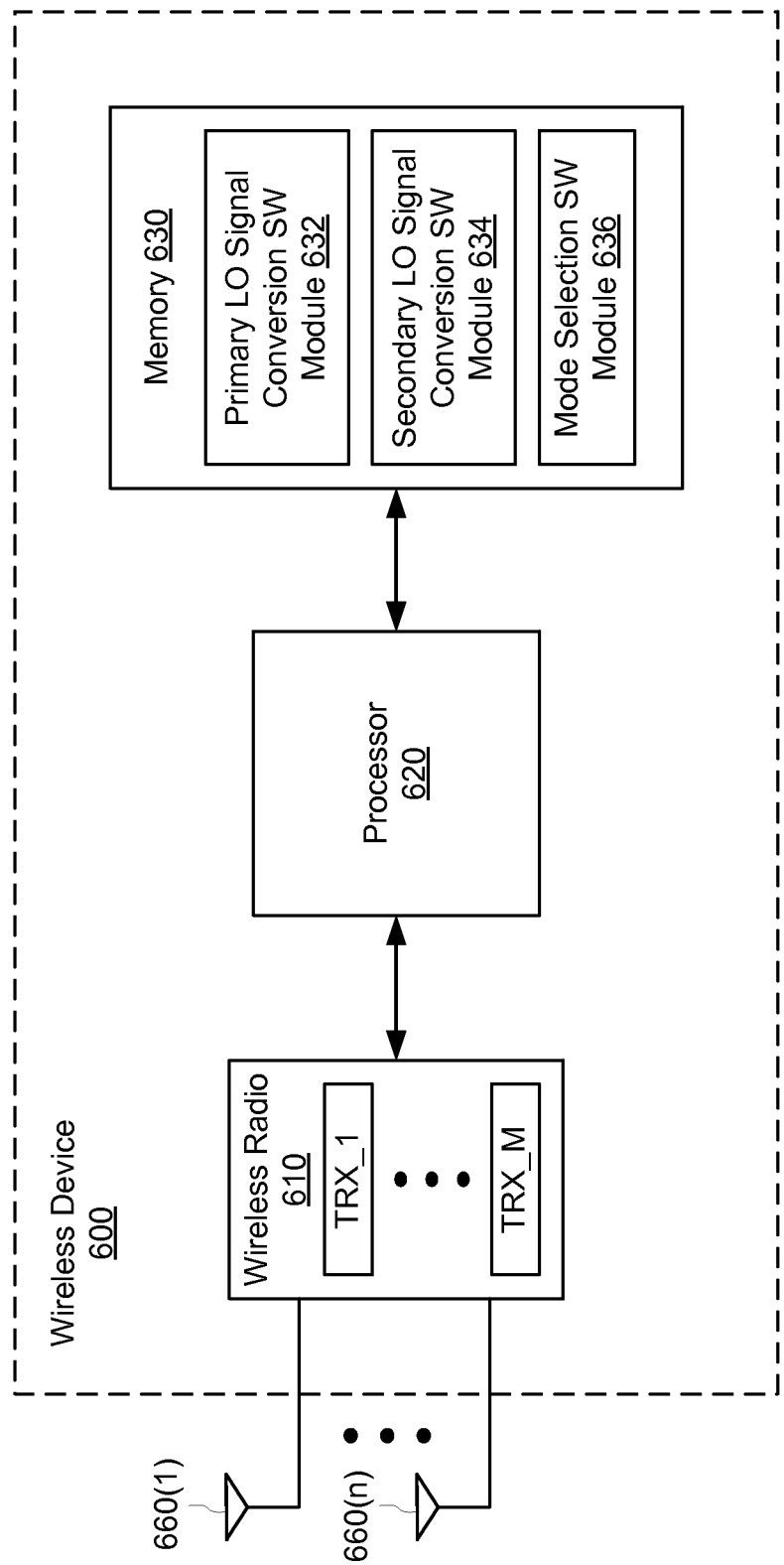
FIG. 6 shows a block diagram of a wireless device in accordance with example embodiments.

FIG. 6 shows a block diagram of a wireless device 600 in accordance with example embodiments. The wireless device 600 includes a wireless radio 610, a processor 620, memory 630, and a number of antennas 660(1)-660(n). In example embodiments, the wireless radio 610 may be operable in an 80+80 Mode and in a BF Mode (e.g., as defined by the IEEE 802.11 ac specification). The wireless radio 610 includes a plurality of transceiver chains TRX_1-TRX_M that may be operable on at least one of a first 80 MHz channel or a second 80 MHz channel of the 5 GHz frequency band. In some embodiments, a number of the transceivers TRX_1-TRX_M may be provided on multiple wireless radios and/or chips. The wireless radio 610 may be coupled to antennas 660(1)-660(n), either directly or through an antenna selection circuit (not shown for simplicity). For purposes of discussion herein, the wireless radio 610 is shown in FIG. 6 as being coupled to processor 620. For actual embodiments, the wireless radio 610, processor 620, and/or memory 630 may be connected together using one or more buses (not shown for simplicity).

Memory 630 may include a non-transitory computer-readable medium (e.g., one or more nonvolatile memory elements, such as EPROM, EEPROM, Flash memory, a hard drive, etc.) that may store at least the following software (SW) modules:

a primary LO signal conversion SW module 632 to generate persistent LO signals at a first carrier frequency (e.g., corresponding to the first 80 MHz channel) by continuously down-converting a first timing signal having a frequency equal to a multiple of the first carrier frequency;

a secondary LO signal conversion SW module 634 to generate persistent LO signals at a second carrier frequency (e.g., corresponding to the second 80 MHz channel) by continuously down-converting a second timing signal having a frequency equal to a multiple of the second carrier frequency; and a mode selection SW module 636 to select the LO signals of the first carrier frequency or the LO signals of the second carrier frequency to be used in one or more of the transceiver chains TRX_1-TRX_M, based at least in part on an operating mode (e.g., the 80+80 Mode or the BF Mode) of the wireless radio 610.

Each software module includes instructions that, when executed by processor 620, causes the wireless device 600 (specifically, the wireless radio 610) to perform the corresponding functions. The non-transitory computer-readable medium of memory 630 thus includes instructions for performing all or a portion of the operations described below with respect to FIG. 7.

Processor 620, which is shown in the example of FIG. 6 as coupled to wireless radio 610 and to memory 630, may be any suitable one or more processors capable of executing scripts or instructions of one or more software programs stored in wireless device 600 (e.g., within memory 630). For example, processor 620 may execute the primary LO signal conversion SW module 632 to generate persistent LO signals at a first carrier frequency (e.g., corresponding to the first 80 MHz channel) by continuously down-converting a first timing signal having a frequency equal to a multiple of the first carrier frequency. Processor 620 may also execute the secondary LO signal conversion SW module 634 to generate persistent LO signals at a second carrier frequency (e.g., corresponding to the second 80 MHz channel) by continuously down-converting a second timing signal having a frequency equal to a multiple of the second carrier frequency. Still further, the processor 620 may execute the mode selection SW module 636 to select the LO signals of the first carrier frequency or the LO signals of the second carrier frequency to be used in one or more transceiver chains TRX_1-TRX_M based at least in part on an operating mode (e.g., the 80+80 Mode or the BF Mode) of the wireless radio 610.

Figure 7:
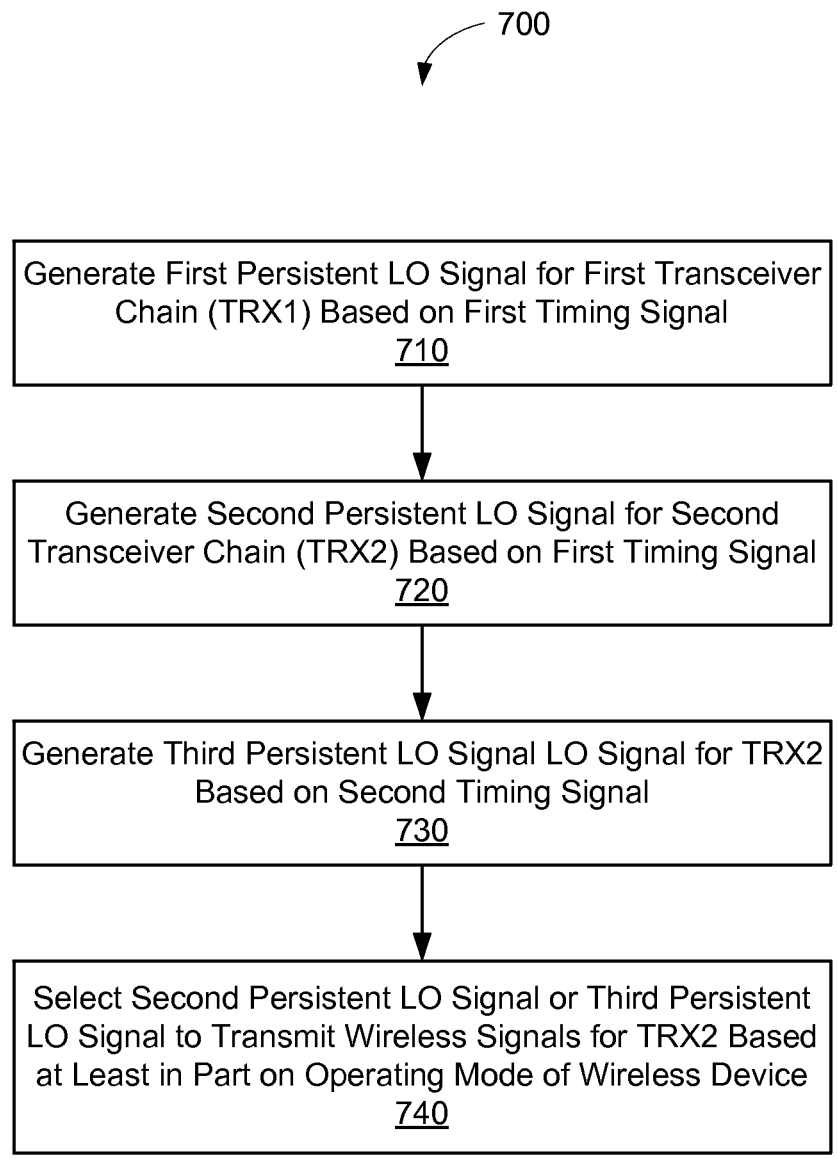
FIG. 7 shows a flowchart depicting an example operation for generating phase-synchronized local oscillator (LO) signals.

FIG. 7 shows a flowchart depicting an example operation 700 for generating phase-synchronized local oscillator (LO) signals. For example, the operation 700 may be implemented by the AP 210 and/or stations STA1 and STA2 of FIG. 2. More specifically, with reference to FIG. 6, the operation 700 may be implemented by the processor 620 of wireless device 600.

The processor 620 may execute the primary LO signal conversion SW module 632 to generate a first persistent LO signal for a first transceiver chain (e.g., TRX1) of the wireless radio 610 based on a first timing signal (710). The first timing signal may be generated at a frequency significantly higher than a first carrier frequency (e.g., associated with a first 80 MHz channel), for example, to reduce and/or mitigate LO leakage at the first carrier frequency (e.g., as described above with respect to FIGS. 3-5). Thus, the processor 620, in executing the primary LO signal conversion SW module 632, may convert the first timing signal to the first persistent LO signal by reducing the frequency of the first timing signal to the first carrier frequency.

The processor 620 may further execute the primary LO signal conversion SW module 632 to generate a second persistent LO signal for a second transceiver chain (e.g., TRX2) of the wireless radio 610 based on the first timing signal (720). For example, the processor 620, in executing the primary LO signal conversion SW module 632, may convert the first timing signal to the second persistent LO signal by reducing the frequency of the first timing signal to the first carrier frequency. In example embodiments, the primary LO signal conversion SW module 632, as executed by the processor 620, may continuously generate the first persistent LO signal and the second persistent LO signal to maintain a constant phase relationship between the first and second persistent LO signals (e.g., regardless of the operating mode of the wireless radio 610).

The processor 620 may execute the secondary LO signal conversion SW module 634 to generate a third persistent LO signal for the second transceiver chain of the wireless radio 610 based on a second timing signal (730). The second timing signal may be generated at a frequency significantly higher than a second carrier frequency (e.g., associated with a second 80 MHz channel), for example, to reduce and/or mitigate LO leakage at the second carrier frequency (e.g., as described above with respect to FIGS. 3-5). Thus, the processor 620, in executing the secondary LO signal conversion SW module 634, may convert the second timing signal to the second persistent LO signal by reducing the frequency of the second timing signal to the second carrier frequency.

Finally, the processor 620 may execute the mode selection SW module 636 to select the second persistent LO signal or the third persistent LO signal to be used for transmitting (and/or receiving) wireless signals in the second transceiver chain based at least in part on an operating mode of the wireless radio 610 (740). For example, the processor 620, in executing the mode selection SW module 636, may select the third persistent LO signal (e.g., to operate the second transceiver chain on the second 80 MHz channel) when the wireless radio 610 and/or wireless device 600 is to operate in the 80+80 Mode. On the other hand, the processor 620, in executing the mode selection SW module 636, may select the second persistent LO signal (e.g., to operate the second transceiver chain on the first 80 MHz channel) when the wireless radio 610 and/or wireless device 600 is to operate in the BF Mode and/or in a single 80 MHz channel bandwidth mode. Because the first and second persistent LO signals are continuously generated and/or maintained, regardless of the operating mode of the wireless radio 610, the wireless device 600 may perform high-speed beamforming (e.g., on the first 80 MHz channel) on a per-packet switching basis.

Figure 8:
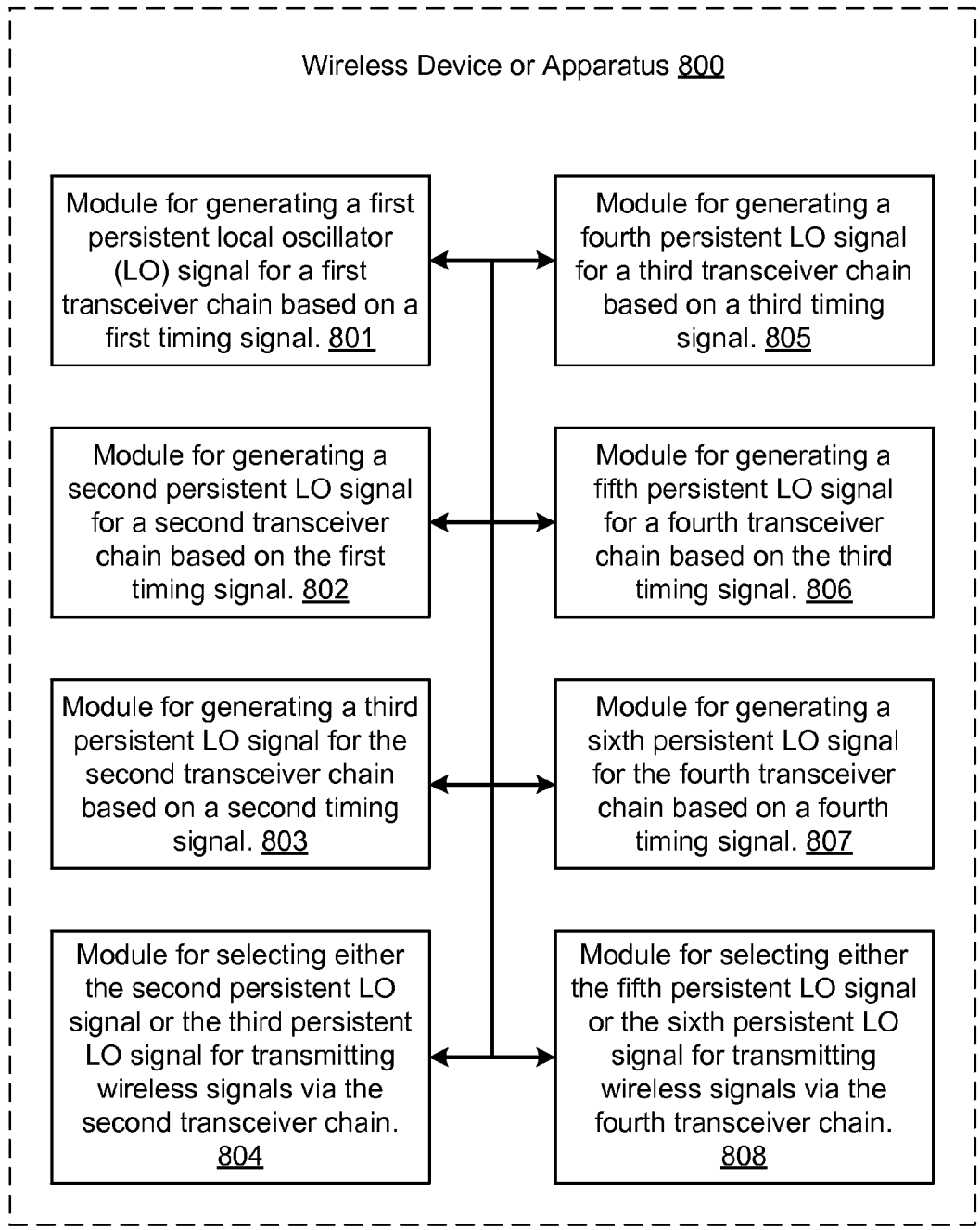
FIG. 8 is another block diagram of several sample aspects of apparatuses configured to generate phase-synchronized LO signals as taught herein.

FIG. 8 shows an example wireless device or apparatus 800 represented as a series of interrelated functional modules. A module 801 for generating a first persistent local oscillator (LO) signal for a first transceiver chain of the wireless device 800 based on a first timing signal may correspond at least in some aspects to, for example, a processor as discussed herein (e.g., processor 620) and/or to a frequency synthesizer and frequency divider as discussed herein (e.g., frequency synthesizer 411 and frequency divider 415). A module 802 for generating a second persistent LO signal for a second transceiver chain of the wireless device 800 based on the first timing signal may correspond at least in some aspects to, for example, a processor as discussed herein (e.g., processor 620) and/or to a frequency synthesizer and frequency divider as discussed herein (e.g., frequency synthesizer 411 and frequency divider 416). A module 803 for generating a third persistent LO signal for the second transceiver chain based on a second timing signal may correspond at least in some aspects to, for example, a processor as discussed herein (e.g., processor 620) and/or to a frequency synthesizer and frequency divider as discussed herein (e.g., frequency synthesizer 413 and frequency divider 417). A module 804 for selecting either the second persistent LO signal or the third persistent LO signal for transmitting wireless signals via the second transceiver chain may correspond at least in some aspects to, for example, a processor as discussed herein (e.g., processor 620) and/or to a multiplexer as discussed herein (e.g., multiplexer 418).

A module 805 for generating a fourth persistent LO signal for a third transceiver chain of the wireless device 800 based on a third timing signal may correspond at least in some aspects to, for example, a processor as discussed herein (e.g., processor 620) and/or to a frequency synthesizer and frequency divider as discussed herein (e.g., frequency synthesizer 421 and frequency divider 425). A module 806 for generating a fifth persistent LO signal for a fourth transceiver chain of the wireless device 800 based on the third timing signal may correspond at least in some aspects to, for example, a processor as discussed herein (e.g., processor 620) and/or to a frequency synthesizer and frequency divider as discussed herein (e.g., frequency synthesizer 421 and frequency divider 426). A module 807 for generating a sixth persistent LO signal for the fourth transceiver chain of the wireless device 800 based on a fourth timing signal may correspond at least in some aspects to, for example, a processor as discussed herein (e.g., processor 620) and/or to a frequency synthesizer and frequency divider as discussed herein (e.g., frequency synthesizer 423 and frequency divider 427). A module 808 for selecting either the fifth persistent LO signal or the sixth persistent LO signal for transmitting wireless signals via the fourth transceiver chain may correspond at least in some aspects to, for example, a processor as discussed herein (e.g., processor 620) and/or to a multiplexer as discussed herein (e.g., multiplexer 428).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A wireless communications device comprising:
   a first transceiver chain including an input to receive a first timing signal, and including a first frequency divider to generate a first local oscillator (LO) signal by reducing a frequency of the first timing signal to a first carrier frequency; and
   a second transceiver chain including inputs to receive the first timing signal and a second timing signal, and further including:
      a second frequency divider to generate a second LO signal by reducing the frequency of the first timing signal to the first carrier frequency;
      a third frequency divider to generate a third LO signal by reducing a frequency of the second timing signal to a second carrier frequency; and
      a first multiplexer to select either the second LO signal or the third LO signal for transmitting wireless signals via the second transceiver chain based at least in part on a mode select signal indicating an operating mode of the wireless communications device.

2. The wireless communications device of claim 1, wherein at least the first frequency divider and the second frequency divider are to remain continuously active and maintain a constant phase relationship between the first LO signal and the second LO signal, independent of the operating mode.

3. The wireless communications device of claim 1, wherein the first multiplexer is to select the second LO signal based on the mode select signal indicating an 80 MHz channel bandwidth mode, and the first multiplexer is to select the third LO signal based on the mode select signal indicating an 80+80 MHz channel bandwidth mode.

4. The wireless communications device of claim 1, further comprising:
   a third transceiver chain including an input to receive a third timing signal, and including a fourth frequency divider to generate a fourth LO signal by reducing a frequency of the third timing signal to the first carrier frequency; and a fourth transceiver chain including inputs to receive the third timing signal and a fourth timing signal, and further including:
- a fifth frequency divider to generate a fifth LO signal by reducing the frequency of the third timing signal to the first carrier frequency;
- a sixth frequency divider to generate a sixth LO signal by reducing a frequency of the fourth timing signal to the second carrier frequency; and
- a second multiplexer to select either the fifth LO signal or the sixth LO signal for transmitting wireless signals via the fourth transceiver chain based at least in part on the mode select signal.

5. The wireless communications device of claim 4, wherein the first frequency divider, the second frequency divider, the fourth frequency divider, and the fifth frequency divider are to remain continuously active and maintain a constant phase relationship between the first LO signal, the second LO signal, the fourth LO signal, and the fifth LO signal, independent of the operating mode.

6. The wireless communications device of claim 4, wherein the third frequency divider and the sixth frequency divider are to remain continuously active and maintain a constant phase relationship between the third LO signal and the sixth LO signal, independent of the operating mode.

7. The wireless communications device of claim 4, further comprising:
- a first frequency synthesizer, provided on a first chip, to generate the first timing signal;
- a second frequency synthesizer, provided on the first chip, to generate the second timing signal;
- a third frequency synthesizer, provided on a second chip, to generate the third timing signal; and
- a fourth frequency synthesizer, provided on the second chip, to generate the fourth timing signal.

8. The wireless communications device of claim 7, wherein the first frequency synthesizer is to maintain a constant phase relationship with the third frequency synthesizer, and the second frequency synthesizer is to maintain a constant phase relationship with the fourth frequency synthesizer.

9. The wireless communications device of claim 7, wherein each of the first frequency synthesizer, the second frequency synthesizer, the third frequency synthesizer, and the fourth frequency synthesizer is locked in phase to a common reference clock signal.

10. The wireless communications device of claim 1, wherein the second transceiver chain further includes:
- a fourth frequency divider to generate a fourth LO signal by reducing the frequency of the first timing signal to the first carrier frequency;
- a fifth frequency divider to generate a fifth LO signal by reducing a frequency of the second timing signal to the second carrier frequency; and
- a second multiplexer to select either the fourth LO signal or the fifth LO signal for receiving wireless signals via the second transceiver chain based at least in part on the mode select signal.

11. A method of generating phase-synchronized local oscillator (LO) signals, the method comprising:
generating a first persistent LO signal in a first transceiver chain of a wireless communications device by reducing a frequency of a first timing signal to a first carrier frequency;

generating a second persistent LO signal in a second transceiver chain of the wireless communications device by reducing the frequency of the first timing signal to the first carrier frequency;

generating a third persistent LO signal in the second transceiver chain by reducing a frequency of a second timing signal to a second carrier frequency; and selecting either the second persistent LO signal or the third persistent LO signal for transmitting wireless signals via the second transceiver chain based at least in part on a mode select signal indicating an operating mode of the wireless communications device.

12. The method of claim 11, further comprising:
maintaining a constant phase relationship between the first persistent LO signal and the second persistent LO signal, independent of the operating mode.

13. The method of claim 11, wherein the selecting comprises:
selecting the second persistent LO signal when the mode select signal indicates an 80 MHz channel bandwidth mode; and
selecting the third persistent LO signal when the mode select signal indicates an 80+80 MHz channel bandwidth mode.

14. The method of claim 11, further comprising:
generating a fourth persistent LO signal in a third transceiver chain of the wireless communications device by reducing a frequency of a third timing signal to the first carrier frequency;
generating a fifth persistent LO signal in a fourth transceiver chain of the wireless communications device by reducing the frequency of the third timing signal to the first carrier frequency;
generating a sixth persistent LO signal in the fourth transceiver chain by reducing a frequency of a fourth timing signal to the second carrier frequency; and
selecting either the fifth persistent LO signal or the sixth persistent LO signal for transmitting wireless signals via the fourth transceiver chain based at least in part on the mode select signal.

15. The method of claim 14, further comprising:
maintaining a constant phase relationship between the first persistent LO signal, the second persistent LO signal, the fourth persistent LO signal, and the fifth persistent LO signal, independent of the operating mode.

16. The method of claim 14, further comprising:
maintaining a constant phase relationship between the third persistent LO signal and the sixth persistent LO signal, independent of the operating mode.

17. The method of claim 14, further comprising:
generating the first and second timing signals on a first chip; and
generating the third and fourth timing signals on a second chip.

18. The method of claim 17, further comprising:
maintaining a constant phase relationship between the first timing signal and the third timing signal; and
maintaining a constant phase relationship between the second timing signal and the fourth timing signal.

19. A wireless communications device comprising:
means for generating a first persistent LO signal in a first transceiver chain of the wireless communications device by reducing a frequency of a first timing signal to a first carrier frequency;
means for generating a second persistent LO signal in a second transceiver chain of the wireless communications device by reducing the frequency of the first timing signal to the first carrier frequency;

means for generating a third persistent LO signal in the second transceiver chain by reducing a frequency of a second timing signal to a second carrier frequency; and means for selecting either the second persistent LO signal or the third persistent LO signal for transmitting wireless signals via the second transceiver chain based at least in part on a mode select signal indicating an operating mode of the wireless communications device.

20. The wireless communications device of claim 19, further comprising:

means for maintaining a constant phase relationship between the first persistent LO signal and the second persistent LO signal, independent of the operating mode.

21. The wireless communications device of claim 19, wherein the means for selecting is to:

select the second persistent LO signal when the mode select signal indicates an 80 MHz channel bandwidth mode; and select the third persistent LO signal when the mode select signal indicates an 80+80 MHz channel bandwidth mode.

22. The wireless communications device of claim 19, further comprising:

means for generating a fourth persistent LO signal in a third transceiver chain of the wireless communications device based by reducing a frequency of a third timing signal to the first carrier frequency;

means for generating a fifth persistent LO signal in a fourth transceiver chain of the wireless communications device by reducing the frequency of the third timing signal to the first carrier frequency;

means for generating a sixth persistent LO signal in the fourth transceiver chain by reducing a frequency of a fourth timing signal to the second carrier frequency; and means for selecting either the fifth persistent LO signal or the sixth persistent LO signal for transmitting wireless signals via the fourth transceiver chain based at least in part on the mode select signal.

23. The wireless communications device of claim 22, further comprising:

means for maintaining a constant phase relationship between the first persistent LO signal, the second persistent LO signal, the fourth persistent LO signal, and the fifth persistent LO signal, independent of the operating mode.

24. The wireless communications device of claim 22, further comprising:

means for maintaining a constant phase relationship between the third persistent LO signal and the sixth persistent LO signal, independent of the operating mode.

25. The wireless communications device of claim 22, further comprising:

means for generating the first and second timing signals on a first chip; and means for generating the third and fourth timing signals on a second chip, wherein each of the first timing signal, the second timing signal, the third timing signal, and the fourth timing signal is locked in phase to a common reference clock signal.

26. A non-transitory computer-readable storage medium storing instructions that, when executed by one or more processors of a wireless device, cause the wireless device to generate phase-synchronized local oscillator (LO) signals by performing operations comprising:

generating a first persistent LO signal in a first transceiver chain of the wireless device by reducing a frequency of a first timing signal to a first carrier frequency;

generating a second persistent LO signal in a second transceiver chain of the wireless device by reducing the frequency of the first timing signal to the first carrier frequency;

generating a third persistent LO signal in the second transceiver chain by reducing a frequency of a second timing signal to a second carrier frequency; and selecting either the second persistent LO signal or the third persistent LO signal for transmitting wireless signals via the second transceiver chain based at least in part on a mode select signal indicating an operating mode of the wireless device.

27. The non-transitory computer-readable storage medium of claim 26, wherein execution of the instructions causes the wireless device to perform operations further comprising:

generating a fourth persistent LO signal in a third transceiver chain of the wireless device based by reducing a frequency of a third timing signal to the first carrier frequency;

generating a fifth persistent LO signal in a fourth transceiver chain of the wireless device by reducing the frequency of the third timing signal to the first carrier frequency;

generating a sixth persistent LO signal in the fourth transceiver chain by reducing a frequency of a fourth timing signal to the second carrier frequency; and selecting either the fifth persistent LO signal or the sixth persistent LO signal for transmitting wireless signals via the fourth transceiver chain based at least in part on the mode select signal.

28. The non-transitory computer-readable storage medium of claim 27, wherein execution of the instructions causes the wireless device to perform operations further comprising:

maintaining a constant phase relationship between the first persistent LO signal, the second persistent LO signal, the fourth persistent LO signal, and the fifth persistent LO signal, independent of the operating mode.

29. The non-transitory computer-readable storage medium of claim 27, wherein execution of the instructions causes the wireless device to perform operations further comprising:

maintaining a constant phase relationship between the third persistent LO signal and the sixth persistent LO signal, independent of the operating mode.

30. The non-transitory computer-readable storage medium of claim 27, wherein execution of the instructions causes the wireless device to perform operations further comprising:

generating the first and second timing signals on a first chip; and generating the third and fourth timing signals on a second chip, wherein each of the first timing signal, the second timing signal, the third timing signal, and the fourth timing signal is locked in phase to a common reference clock signal.

* * * * *